N. L. MORTENSEN.
MOTOR CONTROLLER.
APPLICATION FILED MAR. 26, 1915.
1,320,564.
Patented Nov. 4, 1919.
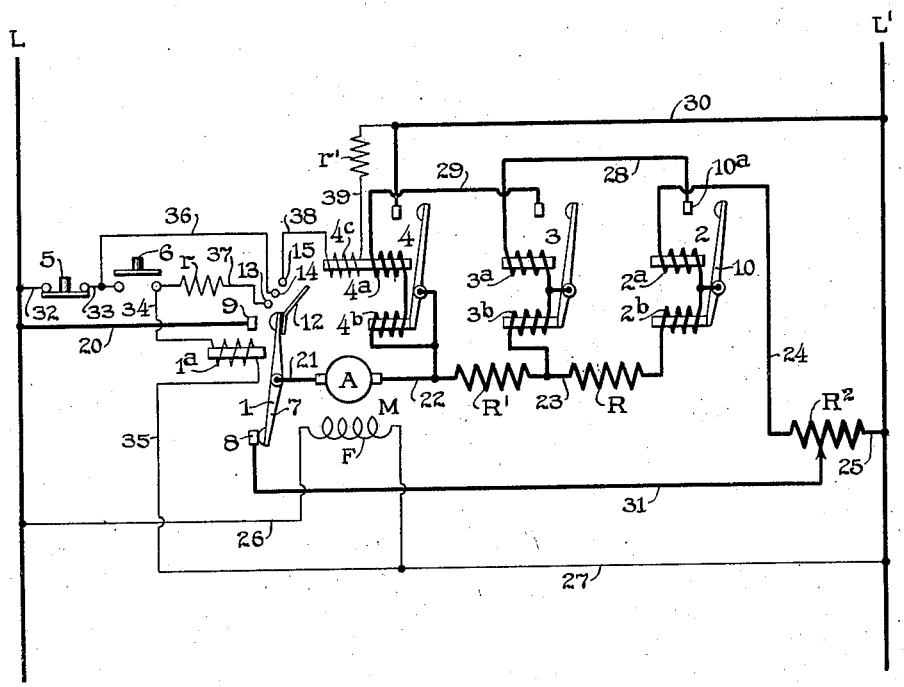

UNITED STATES PATENT OFFICE.

NIELS L. MORTENSEN, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,320,564.     Specification of Letters Patent.     Patented Nov. 4, 1919.

Application filed March 26, 1915. Serial No. 17,261.

*To all whom it may concern:*

Be it known that I, NIELS L. MORTENSEN, a subject of the King of Denmark, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

This invention relates to improvements in motor controllers.

One of the objects of the invention is to provide an improved controller for effecting acceleration and graduated dynamic braking of an electric motor.

A further object of the invention is to provide a simple and efficient controller for effecting acceleration and graduated dynamic braking automatically by the same means and subject to current conditions.

A still further object is to provide a simple and efficient accelerating and dynamic braking controller utilizing so-called lock-out switches for controlling resistance included in circuit with the motor for both acceleration and dynamic braking.

Various other objects and advantages of the invention will hereinafter appear.

The invention will now be more specifically described in connection with the embodiment thereof diagrammatically illustrated in the accompanying drawing, it being understood that various modifications may be made in the controller illustrated without departing from the scope of the appended claims.

Referring to the drawing the motor M to be controlled is illustrated as of the shunt type, being provided with an armature A and a shunt field winding F. It will be understood, however, that the motor might be of the compound wound type, if desired. Also, for the purpose of illustration, the motor has been shown as provided with three sections of series resistance R, R' and $R^2$ for use in accelerating and in dynamic braking, it being understood that any desired number of sections of resistance may be employed and that said sections of resistance need not necessarily be series connected.

The controller includes an electromagnetic main switch 1, electromagnetic switches 2, 3 and 4 to control the resistances R, R' and $R^2$ respectively and push-button control switches 5 and 6 to control the aforesaid electromagnetic switches, as hereinafter set forth.

The switch 1 controls the continuity of both the power connections and the dynamic braking connections of the motor. This switch has a double-ended contact arm 7 normally engaging a contact 8 to complete the dynamic braking connections and movable away therefrom into engagement with a contact 9 to interrupt the dynamic braking connections and to complete the power connections, the winding $1^a$ of said switch serving to move said arm as just described. Thus, upon energization of the switch 1 it progressively opens the dynamic braking circuit and closes the power circuit, whereas upon deënergization it progressively opens the power circuit and completes the dynamic braking circuit. Switch 1 also has auxiliary contacts hereinafter described.

The switches 2 and 3 are of conventional and like form. Referring to switch 2 the same is provided with a double-ended contact arm 10 and two series windings $2^a$ and $2^b$, the former acting upon said arm to move the same into engagement with a contact $10^a$ and the latter serving to restrain said arm against such movement under abnormal current conditions. Both windings $2^a$ and $2^b$ are connected in series with the motor armature and are thus subjected to the full armature current. The switch 4 is similar to switches 2 and 3, as just described, but is provided with an additional winding $4^c$. As will be hereinafter more fully set forth, the switch 4 in closing excludes from circuit its operating windings $4^a$ and the additional winding $4^c$ is provided to retain said switch in closed position.

The push-button switches 5 and 6 are respectively normally closed and normally open and are in series with the operating winding $1^a$ of switch 1. Thus, as will be apparent, closure of switch 6 serves to energize the switch 1, and conversely, release of switch 6 tends to deënergize switch 1. The switch 1, however, has an auxiliary contact 12 which, upon response of said switch, bridges contacts 13 and 14 to establish a shunt circuit around the push-button switch 6. This shunt serves to maintain switch 1 energized independently of switch 6 but subject to deënergization by depression of push-button switch 5. The latter switch, as is apparent, is included in both the energizing and maintaining circuits of switch 1.

The auxiliary contact 12 of switch 1 is also designed to bridge contact 14 with a third contact 15 to complete circuit for the winding 4$^c$ of switch 4 through push-button switch 5. Thus the energization of winding 4$^c$ is dependent upon response of switch 1 and retention of push-button switch 5 in closed position and when said switch 5 is opened it simultaneously deënergizes the windings 1$^a$ and 4$^c$ to release switches 1 and 4.

Considering now the motor connections, the controller functions as follows: Upon response of switch 1 circuit is completed from line L by conductor 20 through said switch, by conductor 21 through the motor armature A, by conductor 22 through resistance R', by conductor 23 through resistance R and both windings of switch 2, by conductor 24 through resistance R$^2$, by conductor 25 to line L'. The field winding F of the motor is permanently connected by conductors 26 and 27 to lines L and L' respectively, and thus upon completion of the armature circuit, as just described, the motor is set in operation. Also, the windings of the switch 2 are energized so that said switch will respond subject to delay by abnormal current conditions to complete circuit from a point between its windings through its contact arm 10 and contact 10$^a$, by conductor 28 through both windings 3$^a$ and 3$^b$ of switch 3 to conductor 23. Thus, switch 2 short-circuits resistance R and its own lockout winding 2$^b$, at the same time including in circuit the windings of switch 3. Switch 3 will therefore respond subject to delay by abnormal current conditions and upon responding completes circuit from a point between its windings through its switch arm, by conductor 29 through windings 4$^a$ and 4$^b$ of switch 4 to conductor 22. This short-circuits resistance R' and renders switch 4 responsive under normal conditions, and when switch 4 responds it connects conductor 22 to conductor 30 and thence to line L'. This, as is apparent, short-circuits all of the starting resistance and also all of the series windings of switches 2, 3 and 4. In consequence the switch 4 is dependent for retention in closed position upon the winding 4$^c$ which, as above set forth, is energized by response of switch 1. The progressive exclusion of resistances R and R' and R$^2$ effects gradual acceleration of the motor, as is well understood.

When now switch 1 is deënergized it interrupts the power circuit and completes the dynamic braking circuit. Simultaneously, the winding 4$^c$ is deënergized and the switch 4 opened whereby the dynamic braking circuit when initially completed extends from the left hand terminal of the motor armature by conductor 21 through switch 1, by conductor 31 through a portion of resistance R$^2$, or if preferred, through a special resistance (not shown) by conductor 24 through windings 2$^a$ and 2$^b$ of switch 2 and through resistance R, by conductor 23 through resistance R', by conductor 22 to the right hand terminal of the motor armature. Two steps of the accelerating resistance are thereby included in the dynamic braking circuit upon initial closure thereof. Likewise the windings of switch 2 are included in the braking circuit whereby under predetermined current conditions said switch acts to exclude resistance R and to include in circuit the windings of switch 3. Exclusion of resistance R permits the braking current to increase to compensate for a decrease in momentum of the motor armature and inclusion of windings 3$^a$ and 3$^b$ renders switch 3 responsive when the braking current again recedes to a certain value. Switch 3 upon responding excludes from circuit the resistance R' to permit restoration of the dynamic braking current to an effective value. Thus is produced a graduated dynamic braking action subject to control by the value of the dynamic braking current whereby the braking current is confined within prescribed limits. The inclusion in the braking circuit of a portion of resistance R$^2$ insures against a complete short-circuit of the motor armature, even when all of the main resistance is excluded from circuit.

As the motor is brought to rest the dynamic braking current is so reduced as to effect deënergization of the resistance switches, or such of the same as may have their windings included in circuit, thereby insuring inclusion of all steps of resistance R, R' and R$^2$ upon response of switch 1 to complete the power connections.

Considering now the control circuits, push-button switch 6 when depressed completes circuit from line L by conductor 32 through push-button switch 5, by conductors 33 and 34 through the winding 1$^a$ of switch 1, by conductors 35 and 27 to line L'. This effects energization and response of switch 1 and establishment of the aforesaid maintaining circuit for said switch 1. This maintaining circuit extends from conductor 33 by conductor 36 to contact 14, bridging contact 12 to contact 13, by conductor 37 through resistance $r$ to conductor 34 and thence through the winding 1$^a$, as already traced. As is apparent, this maintaining circuit constitutes a shunt around push-button switch 6 whereby the release of said switch will have no effect upon the winding 1$^a$. On the other hand, it is apparent that depression of push-button switch 5 will open the circuit of winding 1$^a$ and that switch 1 upon opening will open its maintaining circuit, thereby insuring against its subsequent operation until push-button switch 6 is again closed. The resistance $r$ in the maintaining circuit functions to reduce the flow of current through the winding $1^a$ to protect said winding against overheating and to effect an economy of current.

The circuit of winding $4^c$ extends from line L by conductor 32 through push-botton switch 5, by conductors 33 and 36 to contact 14 and auxiliary contact 12 of main switch 1 to contact 15, by conductor 38 through said winding, by conductor 39 through resistance $r'$ to conductor 30 and thence to line L'. Thus, as above set forth, the winding $4^c$ is dependent for energization upon response of switch 1 and is also dependent upon closure of push-button switch 5. Accordingly when switch 5 is opened winding $4^c$ is deënergized to effect reinsertion of the resistances R, R' and $R^2$ in circuit simultaneously with the opening of main switch 1. Further, main switch 1 in opening interrupts the circuit of winding $4^c$ between contacts 14 and 15 thereby insuring against subsequent energization of said winding until the power connections are reëstablished. The winding $4^c$ is designed for merely holding the switch 4 in closed position and the resistance $r'$ is included in circuit therewith to reduce the flow of current therethrough accordingly.

What I claim as new and desire to secure by Letters Patent is:

1. In combination, an electric motor, a plurality of resistances, a plurality of electromagnetic switches to short circuit said resistances progressively, said switches being self locking against operation under predetermined current conditions, and means to establish power connections for said motor including said resistances and the windings of said switches or alternatively establish dynamic braking connections for said motor including certain of said resistances and the windings of their respective switches, said dynamic braking connections including a connection from the motor to an intermediate point of another of said resistances whereby a part of the latter is always included in said braking connections.

2. In combination, an electric motor, a plurality of resistances, a plurality of electromagnetic switches to short circuit said resistances progressively, each of said switches having series operating and lock-out windings and means to establish power connections for said motor including said resistances and the windings of said switches or alternatively establish dynamic braking connections for said motor including certain of said resistances and the windings of their respective switches, said dynamic braking connections including a connection from the motor to an intermediate point of another of said resistances whereby a part of the latter is always included in said braking connections.

In witness whereof, I have hereunto subscribed my name in the presence of two witnesses.

NIELS L. MORTENSEN.

Witnesses:
 TEKLA BAST,
 L. A. WATSON.

Copies of this patent may be obtained for five cents each, by addressing the "Commissioner of Patents, Washington, D. C."